United States Patent
Venkatraman et al.

(10) Patent No.: US 7,069,424 B2
(45) Date of Patent: Jun. 27, 2006

(54) PLACING FRONT INSTRUCTION IN REPLAY LOOP TO FRONT TO PLACE SIDE INSTRUCTION INTO EXECUTION STREAM UPON DETERMINATION OF CRITICALITY

(75) Inventors: KS Venkatraman, Hillsboro, OR (US); Aravindh Baktha, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 436 days.

(21) Appl. No.: 10/037,023

(22) Filed: Jan. 2, 2002

(65) Prior Publication Data

US 2003/0126407 A1 Jul. 3, 2003

(51) Int. Cl.
G06F 9/30 (2006.01)

(52) U.S. Cl. ............... 712/214; 712/219; 712/243
(58) Field of Classification Search .............. 712/214, 712/219, 243
See application file for complete search history.

(56) References Cited

U.S. PATENT DOCUMENTS

| 5,471,601 | A |   | 11/1995 | Gonzales ............... 711/3 |
| 5,613,083 | A |   | 3/1997  | Glew et al. ............ 711/207 |
| 5,680,565 | A |   | 10/1997 | Glew et al. ............ 711/205 |
| 5,867,701 | A |   | 2/1999  | Brown et al. .......... 712/248 |
| 5,966,544 | A | * | 10/1999 | Sager ..................... 712/32 |
| 6,076,153 | A |   | 6/2000  | Grochowski ............ 712/23 |
| 6,112,317 | A |   | 8/2000  | Berc et al. ............... 714/47 |
| 6,141,715 | A |   | 10/2000 | Porterfield ............. 710/113 |
| 6,247,121 | B1|   | 6/2001  | Akkary et al. ......... 712/239 |
| 6,282,629 | B1|   | 8/2001  | Sager ..................... 712/23 |
| 6,292,882 | B1|   | 9/2001  | Zaidi et al. ............ 712/204 |
| 6,385,715 | B1| * | 5/2002  | Merchant et al. ...... 712/219 |
| 6,477,562 | B1| * | 11/2002 | Nemirovsky et al. .. 718/108 |
| 6,643,767 | B1| * | 11/2003 | Sato ....................... 712/219 |
| 6,735,688 | B1| * | 5/2004  | Upton et al. ........... 712/218 |
| 6,785,803 | B1| * | 8/2004  | Merchant et al. ...... 712/219 |

OTHER PUBLICATIONS

U.S. Appl. No. 09/608,567, filed Jun. 30, 2000, Carmean et al.

* cited by examiner

Primary Examiner—Kenneth S. Kim
(74) Attorney, Agent, or Firm—Kerry D. Tweet

(57) ABSTRACT

A method and apparatus for whacking a μOP based upon the criticality of that μOP. Also disclosed are embodiments of a method for determining the criticality of a μOP.

19 Claims, 8 Drawing Sheets

US 7,069,424 B2

PLACING FRONT INSTRUCTION IN REPLAY LOOP TO FRONT TO PLACE SIDE INSTRUCTION INTO EXECUTION STREAM UPON DETERMINATION OF CRITICALITY

FIELD OF THE INVENTION

The invention relates generally to microprocessors and other processing devices. Specifically, the invention relates to a method and apparatus for intelligently inserting micro-operations into an execution stream via a side-door entry.

BACKGROUND OF THE INVENTION

Microelectronic manufacturers are continually striving to improve the speed and performance of microprocessors and other processing devices, the performance of such devices being dependent upon many factors. One factor affecting the performance of a processor is the scheduling and execution of instructions associated with a piece of code executing on the processor. Typically, a processor includes an instruction decoder that decodes an instruction to create one or more micro-instructions, or micro-operations, that can be understood and executed by the processor. A micro-operation will also be referred to herein as a "µOP." Micro-operations ready for execution are provided to a scheduler, which schedules the order of execution of a series of µOPs. Scheduled µOPs are then inserted into an execution stream and subsequently passed to execution circuitry for execution. A processor may also include a checker that determines whether a µOP has been properly executed. If a µOP has been executed, the µOP is retired. If the µOP did not properly execute, the µOP is sent into a replay loop, wherein the µOP is returned to the scheduler and rescheduled for execution.

Access to the execution stream may be provided via a multiplexer or "MUX." The scheduler output is passed to the execution stream via an input at the MUX, this input often referred to as the "front-door entry" to the execution stream. The flow of µOPs from the scheduler and into the front-door entry of the execution steam—the output of the scheduler including µOPs received from the instruction decoder, as well as µOPs received from the replay loop—may be referred to as the "front-door stream." A typical processor can execute multiple threads of execution (e.g., two) and, further, is capable of executing instructions out of order. Accordingly, the front-door stream may include µOPs for two or more threads, the µOPs for each thread being out-of-order and interleaved with µOPs of other threads.

A processor may also include a page miss handler (PMH). One task of the PMH is to process specific events—such as, for example, page table misses and page splits—that occur during execution of an instruction or piece of code (i.e., a series of front-door µOPs). When such an event occurs, the PMH will generate a series of µOPs to handle the event. These PMH µOPs are provided to the execution stream via a "side-door entry" into the execution stream, the side-door entry comprising a second input to the MUX. The flow of µOPs from the PMH and into the side-door entry of the execution stream may be referred to as the "side-door stream."

On each clock cycle of a processor, only one µOP may be passed to the execution stream via the MUX. In other words, during a clock cycle, the execution stream has only one opportunity to receive—or only one "entry slot" for receiving—a µOP, and that entry slot may receive a µOP from only one of the front-door entry and the side-door entry. Therefore, contention for the entry slot of the execution stream will occur whenever a µOP in the front-door stream—i.e., a "front-door µOP"—is "waiting" for entrance into the execution stream and a µOP in the side-door stream (from the PMH)—i.e., a "side-door µOP"—is also seeking entrance to the execution stream. In conventional processors, when a side-door µOP was pending, the entry slot was automatically "awarded" to the side-door µOP and the front-door µOP was discarded, or "whacked." The whacked front-door µOP was sent into the replay loop and returned to the scheduler for rescheduling. The process of whacking a front-door µOP in favor of a side-door µOP is commonly referred to as "side-door whacking."

Whacking the front-door µOP irrespective of that µOP's characteristics can add significant latency to the execution of piece of code. Certain µOPs in the front-door stream will have a greater impact on the execution of other front-door µOPs and, therefore, are much more critical to the successful execution of an instruction or piece of code. Thus, the process of automatically whacking a front-door µOP in favor of a side-door µOP whenever contention for the entry slot into the execution stream exists, and irrespective of the criticality of the front-door µOP, may increase latency and inhibit performance. Future generations of processors will be expected to perform multiple processes (e.g., handling a page-table miss, handling a cache miss, handling a page split, etc.) in parallel, and a failure to efficiently share the entrance into an execution stream amongst all processes will result in even greater latencies.

DETAILED DESCRIPTION OF THE INVENTION

Figure 1:
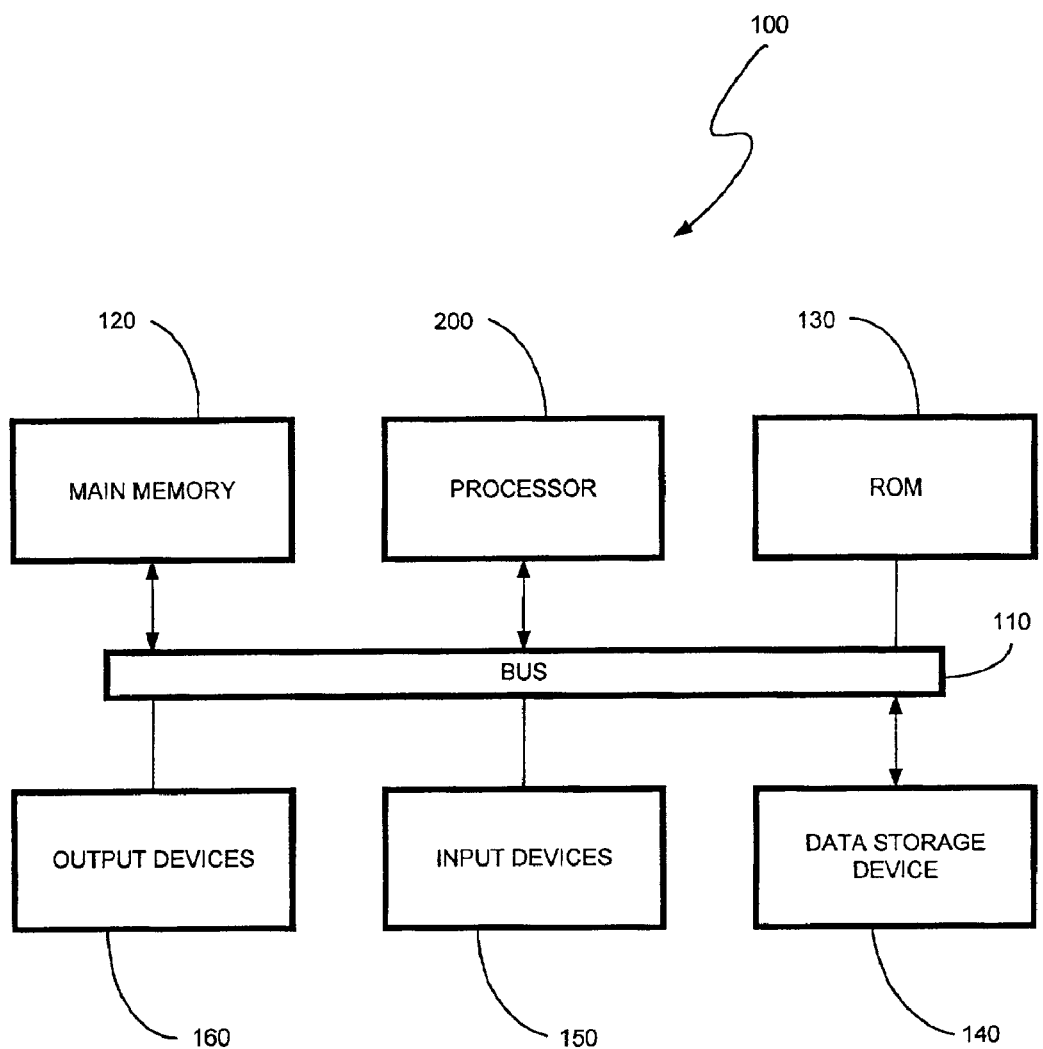
FIG. 1 shows a schematic diagram of an exemplary embodiment of a computer system including a processor having a whacking element.

Referring to FIG. 1, an exemplary embodiment of a computer system 100 is illustrated. The computer system 100 includes a bus 110 having a processor 200 coupled therewith. A main memory 120 is coupled—via bus 110—with the processor 200, the main memory 120 comprising, for example, random access memory (RAM) or other suitable memory. The computer system 100 may further include a read-only memory (ROM) 130 coupled with the bus 110. The processor 200 may also have a data storage device 140 coupled therewith by bus 110. The data storage device 140 comprises any suitable non-volatile memory, such as, for example, a hard disk drive. Computer system 100 may further include one or more input devices 150 coupled with the bus 110. Common input devices 150 include keyboards, pointing devices such as a mouse, and scanners or other data entry devices. One or more output devices 160, such as, for example, a video monitor, may also be coupled with the bus 110.

It should be understood that the computer system 100 illustrated in FIG. 1 is intended to represent an exemplary embodiment of a computer system and, further, that such a computer system may include many additional components, which have been omitted for clarity. By way of example, the computer system 100 may include a removable storage media (e.g., floppy disk drive, CD-ROM drive), a network interface (e.g., a network card), a chip set associated with the processor 200, as well as additional signal lines and buses. Also, it should be understood that the computer system 100 may not include all of the components shown in FIG. 1.

Figure 2:
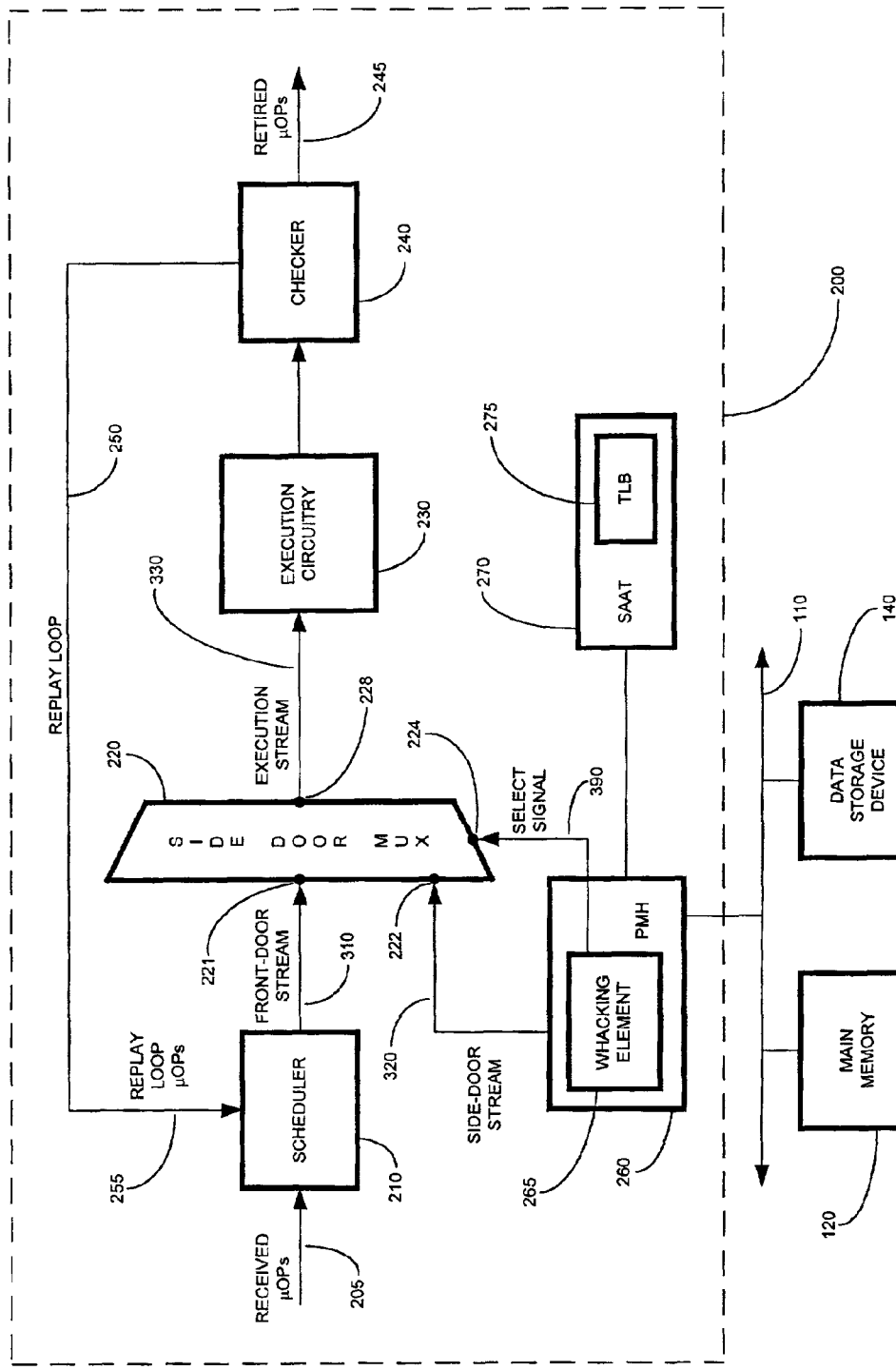
FIG. 2 shows a schematic diagram of the processor illustrated in FIG. 1, the processor including the whacking element.
Figure 3:
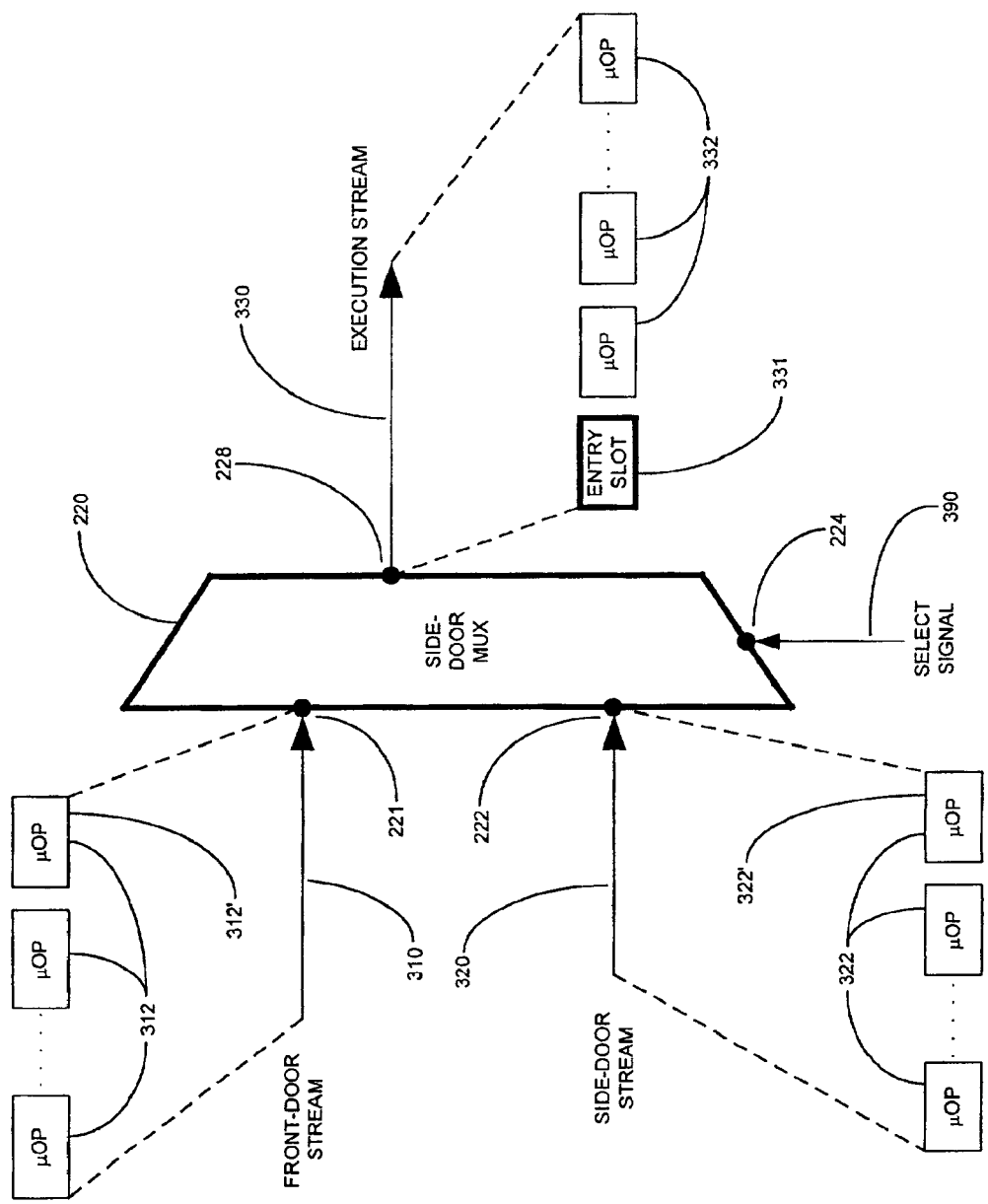
FIG. 3 shows a partial schematic diagram of the processor illustrated in FIGS. 1 and 2.

Referring now to FIG. 2 in conjunction with FIG. 3, the processor 200 is illustrated in greater detail. The processor 200 includes a scheduler 210 that receives μOPs 205 from, for example, an instruction decoder (not shown in figures). As will be explained below, the scheduler 210 may also receive μOPs 255 from a replay loop 250. The received μOPs 205, as well as those μOPs 255 received via replay loop 250, may be associated with a single thread or, alternatively, associated with two or more threads. Scheduling the received μOPs 205 and replay loop μOPs 255 for execution is performed by the scheduler 210. The received μOPs 205 and replay loop μOPs 255 may be scheduled in an out-of-order manner. A stream of scheduled μOPs is output from the scheduler 210, this stream of scheduled μOPs being referred to herein as the "front-door stream" 310.

The front-door stream 310 is provided to a first input 221 of a selector or multiplexer 220, the multiplexer 220 having a second input 222 as well as an output 228. The multiplexer (or selector) 220 comprises any suitable circuitry and/or logic capable of receiving multiple inputs and, in response to a received signal (e.g., a select signal), selecting one of the multiple inputs for the output of the multiplexer. The multiplexer (or selector) 220 will be referred to herein as the "side-door MUX." As will be explained in greater detail below, the second input 222 of the side-door MUX 220 receives a "side-door stream" of μOPs 320 from a page miss handler (PMH) 260. The side-door MUX 220 places μOPs received from the front-door and side-door streams 310, 320 into an execution stream 330, the execution stream 330 being coupled with the output 228 of the side-door MUX 220. The execution stream 330 passes the μOPs to execution circuitry 230 for execution. Another input 224 of the side-door MUX 220 receives the select signal 390 from the PMH 260.

The processor 200 may also include a checker 240 coupled with the execution circuitry 230. The checker 240 verifies that each μOP in the execution stream 330 has successfully executed in execution circuitry 230. A μOP that has successfully executed is retired (see reference numeral 245). However, if a μOP has not, for any reason, successfully executed, the checker 240 feeds the unexecuted μOP into the replay loop 250. The replay loop 250 returns the unexecuted μOP to the scheduler 210, such that the unexecuted μOP can be rescheduled and again provided to the execution stream 330.

As noted above, a page miss handler 260 is coupled with the second input 222 of the side-door MUX 220. The PMH 260 may be coupled with a segmentation and address translation unit (SAAT) 270, and the SAAT 270 may include a translation lookaside buffer (TLB) 275, which provides a cache for virtual-to-physical address translations. The PMH 260 includes circuitry and/or instructions for handling certain events, such as a page miss, a cache miss, a TLB miss, a page split, or a cache split, as well as other events. Generally, such an event occurs in response to execution of one or more μOPs in the front-door stream. For example, a page miss, cache miss, or TLB miss may occur in response to a series of μOPs representing a load instruction. The PMH 260 may process a single event at a time or, alternatively, the PMH 260 may process multiple events (e.g., a page miss and a page split) in parallel.

In response to one of the aforementioned events, the PMH 260 will generate one or more μOPs to process the event, and these μOPs are inserted into the execution stream 330 via the side-door stream 320 and input 222 at side-door MUX 220. The SAAT 270, which interfaces directly with the PMH 260, detects the occurrence of any such event and issues a request to the PMH 260 to process the detected event. By way of example, if the SAAT 270 detects a TLB miss—as previously described, the TLB 275 provides a cache for virtual-to-physical address translations—the SAAT 270 will issue a request to the PMH 260, this request directing the PMH 260 to execute a page walk in order to load the appropriate physical address translation from main memory 120 and into the TLB 275. The PMH 260 will generate one or more μOPs to handle the page walk.

It should be understood that the processor 200 illustrated in FIGS. 2 and 3 is intended to represent an exemplary embodiment of a processor and, further, that such a processor may include many additional components that are not shown in these figures, these components having been omitted for ease of understanding. For example, the processor 200 may include an instruction decoding unit (as previously suggested), one or more execution units (e.g., for floating point operations, for integer operations, etc.), a register file unit, a bus interface unit, as well as internal clock circuitry. Also, it should be understood that many of the components shown in FIG. 2 may be combined and/or share circuitry. By way of example, the SAAT 270 (including TLB 275), PMH 260 (including whacking element 265), and the side-door MUX 220 may comprise part of a single, integrated system commonly known as a memory execution unit (MEU). Most importantly, the embodiments described herein are not limited to any particular architecture or arrangement—as well as not being limited to any particular terminology used to described such an architecture or arrangement—and the disclosed embodiments may be practiced on any type of processing device, irrespective of its architecture or the terminology ascribed to it.

Figure 4:
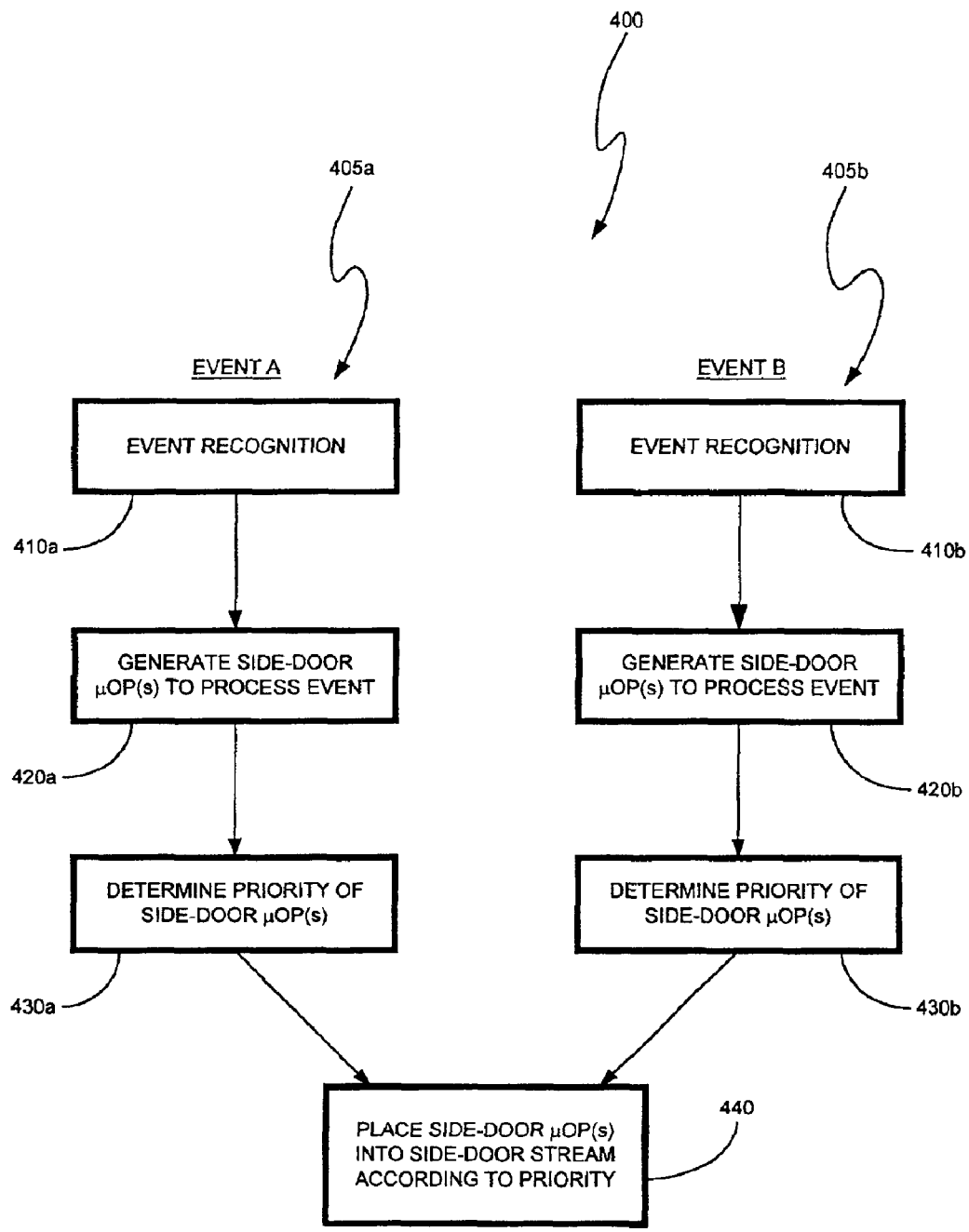
FIG. 4 is a flow chart illustrating an exemplary embodiment of operation of the processor of FIGS. 2 and 3.

The PMH 260 of processor 200 processes certain types of events—including page misses, cache misses, TLB misses, page splits, and cache splits—and the PMH 260 may process two or more such events in parallel, as set forth above. For example, as illustrated by the method 400 shown in FIG. 4, the PMH 260 may process a first event 405*a* ("EVENT A") and a second event 405*b* ("EVENT B") in parallel. However, the PMH 260 may, of course, process only one such event or, perhaps, more than two such events.

To process the events 405*a*, 405*b*, the PMH must first recognize that these events have occurred, as shown at blocks 410*a*, 410*b*. Event recognition is provided by a command or request received from the SAAT 270, which detects the occurrence of the aforementioned events. Upon recognition of the events 405*a*, 405*b*, respectively, the PMH will generate one or more μOPs to process each of the events 405a, 405b, which is illustrated by blocks 420a, 420b. The μOPs for each event 405a, 405b are to eventually be forwarded to the execution stream 330 via the side-door stream 320 (look ahead to reference numeral 440); however, when processing multiple events in parallel, not all of the events may be of equal priority. Thus, it may be desirable to assess the priority of each side-door μOP 322 (or each series of side-door μOPs 322 associated with an event)—see blocks 430a, 430b—in order to determine the order in which these μOPs should be provided to the side-door stream 320 and, hence, to the execution stream 330. As shown at block 440, the side-door μOPs are then provided to the side-door stream 320 according to their respective priorities.

Referring again to FIG. 3, the side-door MUX 220 receives the μOPs provided to the side-door stream 320—i.e., "side-door μOPs" 322—as well as receiving μOPs from the front-door stream 310—i.e., "front-door μOPs" 312—and these μOPs 312, 322 must be inserted into the execution stream 330. During each clock cycle of the processor 200, however, only one μOP may be placed in the execution stream 330. Stated another way, there is only one "entry slot" 331 into the execution stream during a clock cycle, and the front-door stream 310 and side-door stream 320 must share this single point of entry. In essence, the entry slot 331 represents an opportunity to place a μOP into the execution stream 330.

For conventional processors, as previously described, the entry slot into the execution stream was always awarded to the side-door stream if a side-door μOP was pending, and any pending front-door μOP was automatically discarded or whacked. No attempt was made to assess the criticality and, hence, the potential for increased latency of the whacked front-door μOP. This failure to efficiently share the execution stream between the front-door and side-door streams resulted in decreased performance.

To intelligently select which of two pending μOPs—i.e., a "next-in-line" front-door μOP 312' and a "next-in-line" side-door μOP 322'—should be awarded the entry slot 331 into the execution stream 330 on any given clock cycle, the processor 200 further includes a whacking element 265 coupled with, and/or forming a part of, the PMH 260 (see FIG. 2). The whacking element 265 comprises any suitable circuitry and/or instructions capable of assessing the criticality of a pending front-door μOP 312' and, based upon this measure of the criticality of this μOP, determining which of the pending front-door μOP 312' and a pending side-door μOP 322' should be awarded the entry slot 331 of execution stream 330. Thus, the whacking element 265 provides for the efficient sharing of the entry slot 331 into the execution stream 330. Operation of the whacking element 265 and PMH 260 is explained in detail below.

The criticality of a μOP may depend upon any one of several factors or a combination thereof. When a front-door μOP 312 is contending for the entry slot in the execution stream, that μOP has been processed by the scheduler 210 and has made its way through the front-door stream 310. This pending μOP is often times the "oldest" (or one of the "oldest") μOP in the front-door stream 310. Execution of many subsequent or "younger" μOPs in the front-door stream 310 may hinge on successful execution of such an "old" μOP. Thus, if an older front-door μOP is whacked in favor of a side-door μOP, significant latency may be incurred, as it may take several clock cycles (e.g., 18) for the whacked front-door μOP to make its way back to the execution stream. Further, even after making its way back through the replay loop 250 and the scheduler 210, the whacked front-door μOP may again be whacked if another side-door μOP is pending. The repeated whacking of an old μOP may lead to a "live lock-up," wherein a piece of code reaches a state of virtual lock-up because younger μOPs can not successfully execute prior to execution of a repeatedly whacked old μOP. Also, the potential for whacking an old μOP—rather than whacking a younger μOP—is greater during out-of-order execution of instructions, a practice now commonplace in many processors.

Another factor that may be indicative of the criticality of a μOP is thread priority. A multi-threaded processor may, at any instant, favor one thread over other threads, the favored thread having a higher priority. The front-door stream 310 may include μOPs from two or more threads, as previously noted, and one of these threads may have a higher priority than other threads. Accordingly, performance may suffer if a μOP associated with a high priority thread is whacked rather than a μOP associated with a thread that has not been given priority. Thus, in addition to the "age" of a μOP, the thread priority associated with a μOP may determine that μOP's criticality and, hence, its impact on the successful execution of a piece of code. It should be understood that other criteria may provide a measure of the criticality a μOP.

Figure 5:
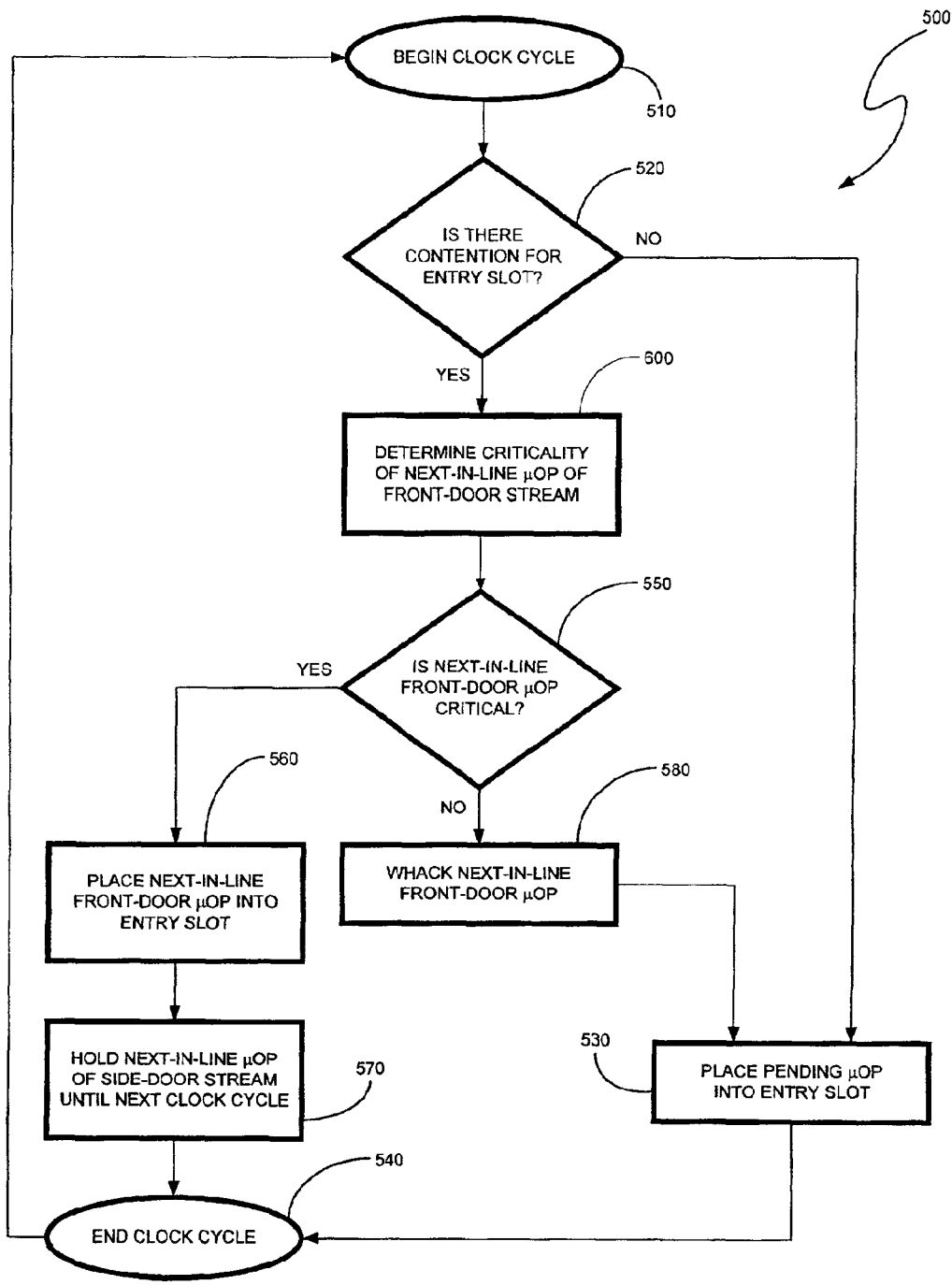
FIG. 5 is a flow chart illustrating an exemplary embodiment of a method of whacking µOPs, as may be performed by the whacking element of FIG. 2.

Illustrated in FIG. 5 is an embodiment of a method 500 of intelligently whacking front-door μOPs. The method 500 of whacking front-door μOPs may be used to determine which of a next-in-line front-door μOP 312' and a next-in-line side-door μOP 322' should be placed in the execution stream 330 during a clock cycle. It should be understood, however, that the method 500 of intelligently whacking μOPs—as well as the embodiments (see FIGS. 6, 7, and 8) of a method for determining the criticality of a μOP, as will be described below—are not limited in application to the PMH 260 and side-door MUX 220 of FIGS. 2 and 3. Rather, the apparatus and methods disclosed herein are generally applicable to any architecture wherein multiple inputs are contending for a single point of entry into an execution stream.

Referring now to FIG. 5, during a clock cycle—see reference numerals 510 and 540—it is determined whether there is contention for the entry slot 331 into the execution stream 330. If there is both a front-door μOP 312' and a side-door μOP 322' seeking entrance into the execution stream 330, as shown at reference numeral 520, contention for the entry slot 331 will exist. If, upon examination, it is found that no contention for the entry slot 331 exists—i.e., only a front-door μOP 312' is pending or only a side-door μOP 322' is pending, but not both—the pending μOP is awarded access to the entry slot 331, as illustrated at block 530.

If there is contention for the entry slot 331 of execution stream 330, the criticality of the next-in-line front-door μOP 312'—and, hence, whether to whack the next-in-line front-door μOP—is determined, as shown at block 600. If the next-in-line front-door μOP 312' is "critical," that front-door μOP 312' will not be whacked in favor of a next-in-line side-door μOP 322'. If not "critical," the pending front-door μOP 312' will be whacked or discarded and sent into the replay loop 250. A μOP is deemed "critical" if its criticality—as determined based upon an examination of criteria such as, for example, age and thread priority—is such that a failure to place that μOP into the execution stream 330 will add significant latency to the execution of a piece of code or will otherwise negatively impact performance of the processor 200. Embodiments of a method of determining the criticality of a μOP are described below.

Referring to reference numeral 550, if the next-in-line front-door μOP 312' is critical, that μOP is awarded entry into the execution stream 330 and is placed in the entry slot 331, as shown at block 560. If a next-in-line front-door μOP 312' is awarded the entry slot 331, the next-in-line side-door SLOP 322' is held until the next clock cycle, as illustrated at 570, at which time that side-door μOP may again be considered for entry into the execution stream. On the other hand, if it is determined that the next-in-line front-door μOP 312' is not critical—refer again to reference numeral 550—that front-door μOP is whacked, as shown at block 580, and passed to the replay loop 250. With the pending front-door μOP 312' whacked, the entry slot 331 of execution stream 330 is awarded to the next-in-line side-door μOP 322', as illustrated at block 530.

The method 500 of whacking front-door μOPs is presented—for clarity and ease of understanding—in the context of a single clock cycle in which there is one opportunity to insert a μOP into the execution stream 330. However, it should be understood that the apparatus and methods disclosed herein are not so limited and, further, that the disclosed embodiments are generally applicable to any type of clock architecture and/or method of providing a clock signal. For example, it may be possible to have multiple opportunities to insert a μOP into the execution stream 330 during a clock cycle (e.g., as may be achieved by inserting a μOP on both the rising and falling edges of a clock signal). Also, there may be instances where no μOP is passed to the execution stream 330 during a clock cycle or during every clock cycle. In general, the disclosed apparatus and methods may be applied whenever there is an opportunity—i.e., an entry slot—for inserting a μOP into an execution stream.

Figure 6:
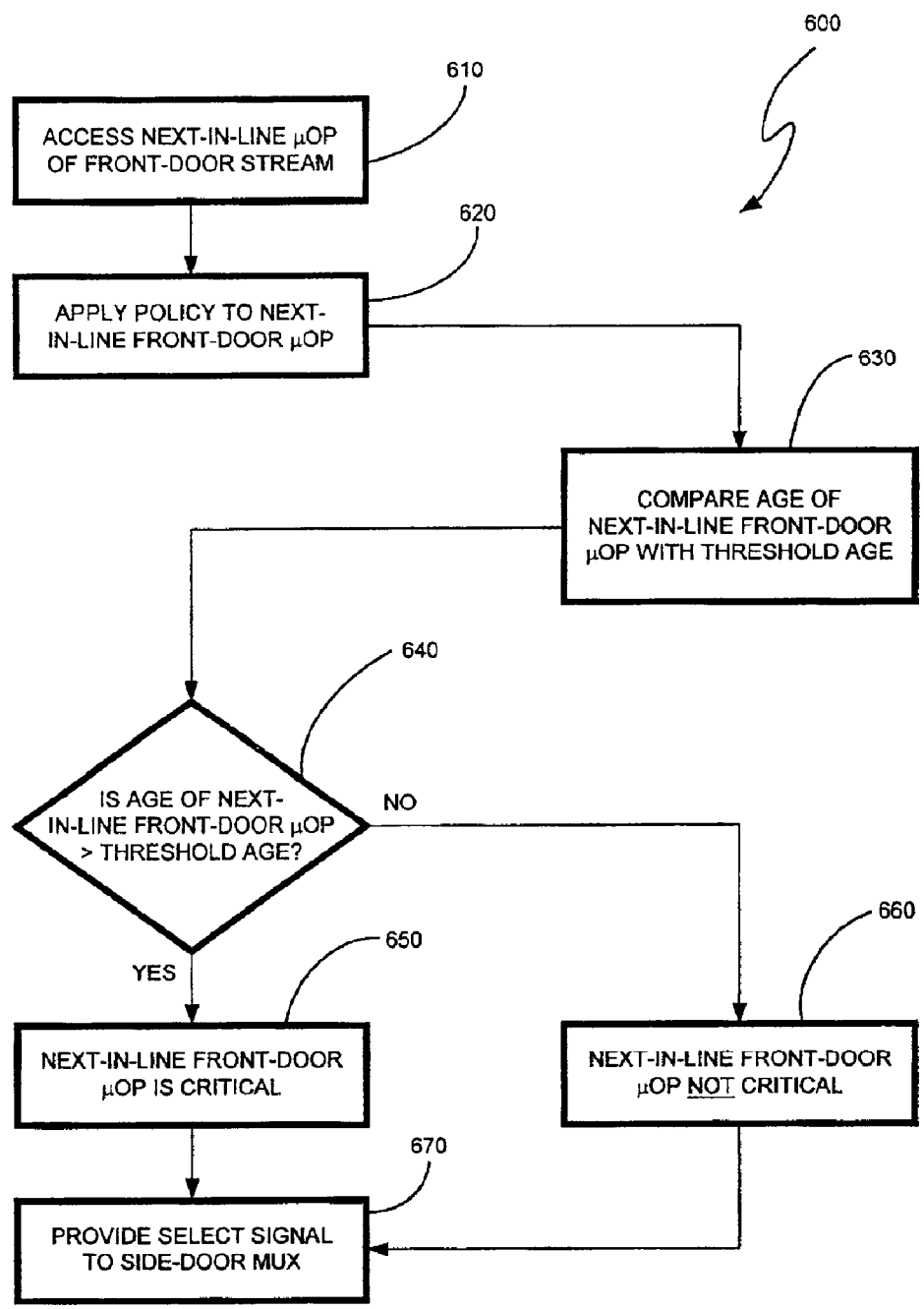
FIG. 6 is a flow chart illustrating an embodiment of a method of determining the criticality of a µOP, as may be performed by the whacking element.

Embodiments of a method of determining or examining the criticality of a next-in-line front-door μOP 312'—or, more generally, any μOP—are now described. Referring to FIG. 6, one embodiment of a method 600 of determining the criticality of a μOP is illustrated, as may be performed by whacking element 265. As shown a block 610, the next-in-line front-door μOP 312' is accessed to obtain knowledge of its characteristics. Specifically, for the method 600 of FIG. 6, the age of the next-in-line front-door μOP 312' is ascertained. A predefined policy is then applied to the next-inline front-door μOP 312', which is illustrated by block 620. The policy comprises one or more metrics that measure the criticality of a μOP and determine whether the μOP is to be considered critical and protected against whacking. For the method 600 of examining criticality, the policy comprises comparing the age of the next-in-line front-door μOP 312' against a specified threshold age, as shown at block 630. The threshold age may, by way of example, correspond to the oldest front-door μOP. Similarly, the threshold age may correspond to, for example, the three oldest front-door μOPs or, more generally, to the N oldest μOPs. As previously described, old μOPs are generally more critical than younger μOPs and a failure to execute such old μOPs can significantly impact performance.

Referring to reference numeral 640, if the age of the next-in-line front-door μOP 312' is greater than the threshold age, the next-in-line front-door μOP 312' is identified as critical, as shown at block 650. Conversely, if the age of the next-in-line front-door μOP 312' is less than the threshold age, the next-in-line front-door μOP 312' is not critical, as illustrated at block 660. Once the criticality of the next-in-line front-door μOP 312' has been determined—and, hence, whether the pending front-door μOP 312' should be whacked—a select signal 390 is issued or generated by the whacking element 265 (or by the PMH 260) and is provided to the side-door MUX 220, as illustrated at block 670. The select signal 390 indicates to the side-door MUX 220 which of the two inputs 221, 222 is to receive a μOP. If the first input 221 is selected, the next-in-line front-door μOP 312' is received and passed to the execution stream 330. If, however, the second input 222 is selected, the next-in-line side-door μOP 322' is received and passed to the execution stream 330, whereas the next-in-line front-door μOP 312' is whacked and sent into the replay loop 250.

Figure 7:
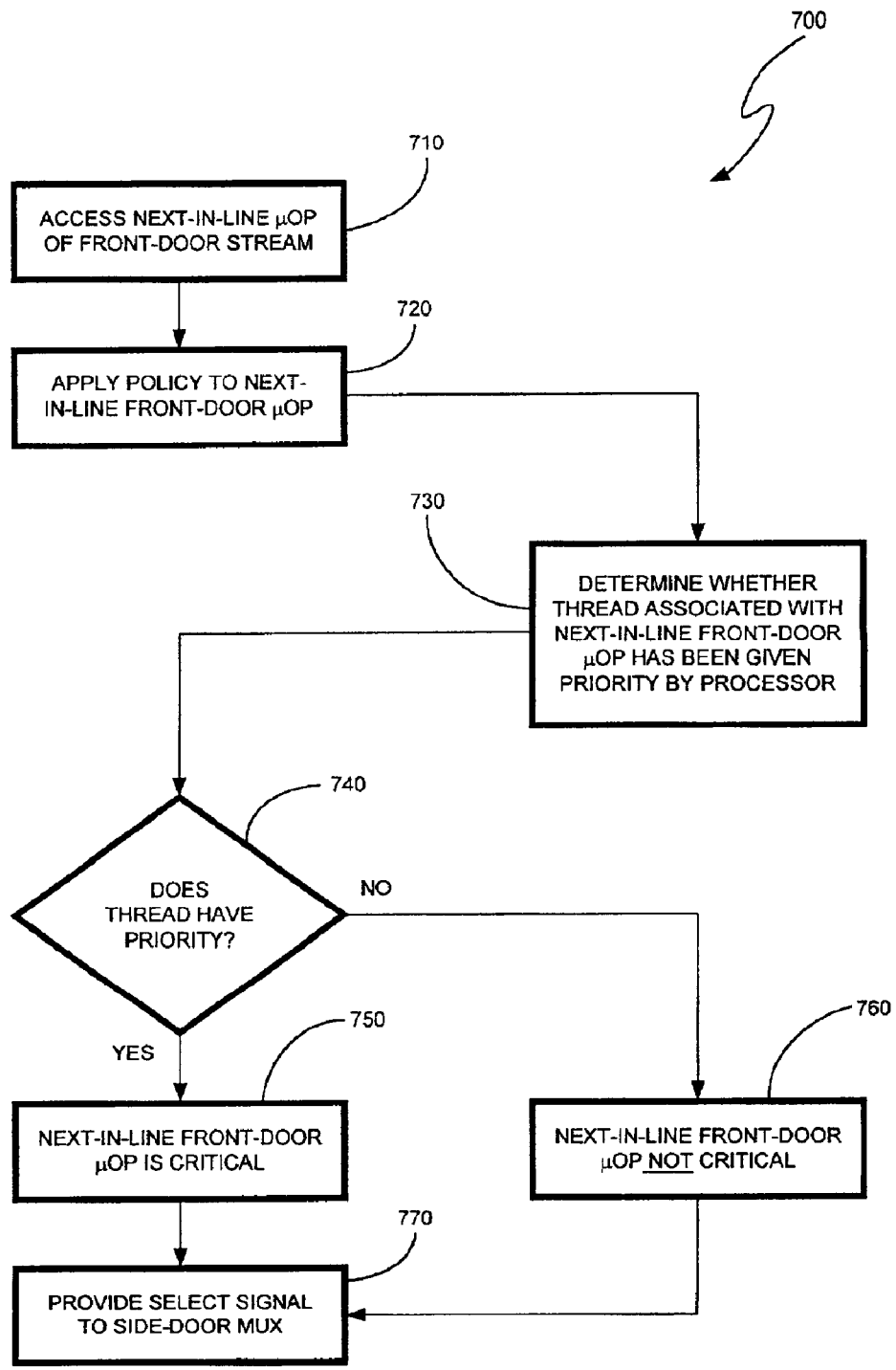
FIG. 7 is a flow chart illustrating another embodiment of the method of determining the criticality of a µOP.

Referring to FIG. 7, another embodiment—as denoted by reference numeral 700—of the method of determining or examining the criticality of a FLOP is illustrated. As shown a block 710, the next-in-line front-door μOP 312' is accessed to obtain knowledge of its characteristics. Specifically, for the method 700 of FIG. 7, the thread associated with the next-in-line front-door μOP 312' is ascertained. A predefined policy is then applied to the next-in-line front-door μOP 312', which is illustrated by block 720. During a given time period, the processor 200 may favor a certain thread (or threads) and grant priority to that thread. Over time, changing conditions may dictate that a different thread be given priority, and the processor may switch back and forth between threads. Accordingly, the policy may comprise determining whether the thread associated with the next-in-line front-door μOP 312' has been given priority by the processor 200, as shown at block 730.

Referring to reference numeral 740, if the thread associated with the next-in-line front-door μOP 312' has priority, the next-in-line front-door μOP 312' is deemed critical, as shown at block 750. Conversely, if the thread associated with the next-in-line front-door μOP 312' does not have priority, the next-in-line front-door μOP 312' is not critical, as illustrated at block 760. Once the criticality of the next-in-line front-door μOP 312 has been determined, the select signal 390 is issued to the side-door MUX 220, as shown at block 770. Again, the select signal 390 indicates to the side-door MUX 220 which of the two inputs 221, 222 is to receive a μOP. If the first input 221 is selected, the next-in-line front-door μOP 312' is received and passed to the execution stream 330. If, however, the second input 222 is selected, the next-in-line side-door μOP 322' is received and passed to the execution stream 330, whereas the next-in-line front-door μOP 312' is whacked and sent into the replay loop 250.

It should be understood that the embodiments 600, 700 of the method of determining the criticality of a μOP are only exemplary and, further, that any suitable metric, or combination of metrics, may be employed to assess the criticality of a μOP. For example, rather than looking to either the age or thread priority associated with a μOP individually, both age and thread priority may be considered in determining whether to protect a front-door μOP. More generally, as illustrated in FIG. 8, a policy may be employed that includes any suitable number of metrics.

Figure 8:
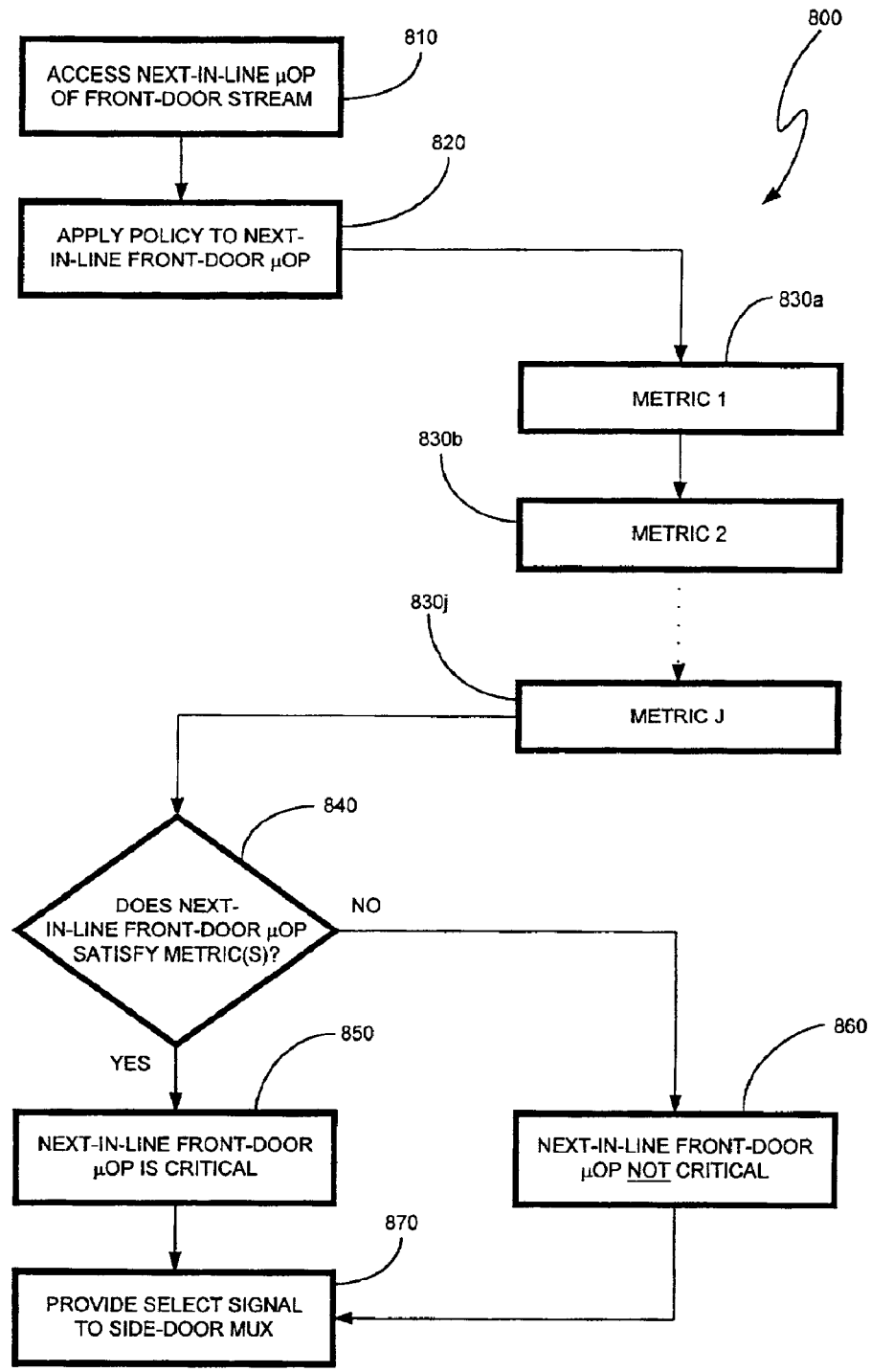
FIG. 8 is a flow chart illustrating a further embodiment of the method of determining the criticality of a µOP.

Referring to block 810 in FIG. 8, the next-in-line front-door μOP 312' is accessed to obtain knowledge of its characteristics. Characteristics such as age and thread priority, as well as other properties, are ascertained. A predefined policy is then applied to the next-in-line front-door μOP 312', as shown at block 820. The policy comprises any suitable number of metrics or criteria—such as, for example, metrics 830a, 830b, . . . , 830j—that may be used to evaluate the criticality of a μOP and, further, to determine whether the μOP is to be protected against whacking. As illustrated at reference numeral 840, it is then determined whether the next-in-line front-door μOP 312' satisfies the metric, or metrics (e.g., metrics 830a–j). If the next-in-line front-door μOP 312' satisfies the metrics 830a–j, or a specified portion of these metrics, the next-in-line front-door μOP 312' is critical, as shown at block 850. Conversely, if the next-in-line front-door μOP 312' does not satisfy the metrics 830*a–j*, or at least a specified number of these metrics, the next-in-line front-door μOP 312' is not critical, as illustrated at block 860. After determining the criticality of the next-in-line front-door μOP 312', the select signal 390 is provided to the side-door MUX 220, as illustrated at block 870.

An embodiment of a method 500 of intelligently whacking μOPs—as well as embodiments 600, 700, 800 of a method of determining the criticality of a μOP—having been herein described, those of ordinary skill in the art will appreciate the advantages thereof. When two μOPs—e.g., a pending front-door μOP and a pending side-door μOP—are contending for entrance into an execution two pending μOPs is made based upon the criticality of one of the μOPs, thereby avoiding the whacking of a critical (e.g., old) μOP and minimizing latency. Any suitable metric or combination of metrics may be used to determine the criticality of a μOP.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

What is claimed is:

1. A method comprising:
   determining a criticality of a next-in-line μOP of a front-door stream, the front-door stream including μOPs received from a scheduler and a replay loop;
   if the next-in-line front-door μOP is not critical, placing the next-in-line front-door μOP into the replay loop and placing a next-in-line μOP of a side-door stream into an execution stream; and
   if the next-in-line front-door μOP is critical, placing the next-in-line front-door μOP into the execution stream and holding the next-in-line side-door μOP.

2. The method of claim 1, wherein the determination of the criticality of the next-in-line front door μOP is based on one or more metrics selected from a group consisting of an age of the next-in-line front door μOP and a priority of a thread associated with the next-in-line front door μOP.

3. The method of claim 1, wherein holding the next-in-line side-door μOP comprises holding the next-in-line side-door μOP until a next clock cycle.

4. A method comprising:
   examining whether there is contention for an entry slot into an execution stream;
   examining a criticality of a next-in-line μOP of a front-door stream if there is contention at the entry slot, the front-door stream including μOPs received from a scheduler and a replay loop;
   if the next-in-line front-door μOP is not critical, placing the next-in-line front-door μOP into the replay loop and placing a next-in-line μOP of a side-door stream into the entry slot; and
   if the next-in-line front-door μOP is critical, placing the next-in-line front-door μOP into the entry slot and holding the next-in-line side-door μOP.

5. The method of claim 4, wherein the criticality of the next-in-line front door μOP is based on one or more metrics selected from a group consisting of an age of the next-in-line front door μOP and a priority of a thread associated with the next-in-line front door μOP.

6. The method of claim 4, wherein holding the next-in-line side-door μOP comprises holding the next-in-line side-door μOP until a next clock cycle.

7. The method of claim 4, further comprising placing a pending μOP into the entry slot if there is no contention for the entry slot, the pending μOP comprising a next-in-line μOP of one of the front-door stream and the side-door stream.

8. A device comprising
   a multiplexer having a first input, a second input, and an output;
   a scheduler coupled with the first input, the scheduler to provide a front-door stream to the multiplexer, the front-door stream including μOPs received from a replay loop; and
   a page miss handler coupled with the second input, the page miss handler to provide a side-door stream to the multiplexer, the page miss handler to determine a criticality of a next-in-line μOP of the front-door stream,
   if the next-in-line front-door μOP is not critical, place the next-in-line front-door μOP into the replay loop and place a next-in-line μOP of the side-door stream into the output of the multiplexer, and
   if the next-in-line front-door μOP is critical, place the next-in-line front-door μQP into the output of the multiplexer and hold the next-in-line side-door μOP.

9. The device of claim 8, wherein the determination of the criticality of the next-in-line front door μOP is based on one or more metrics selected from a group consisting of an age of the next-in-line front door μOP and a priority of a thread associated with the next-in-line front door μOP.

10. The device of claim 8, the page miss handler to hold the next-in-line side-door μOP until a next clock cycle.

11. The device of claim 8, further comprising execution circuitry coupled with the output of the multiplexer.

12. The device of claim 8, the page miss handler to provide a select signal to another input of the multiplexer.

13. The device of claim 8, the page miss handler coupled with a whacking element, the whacking element to determine the criticality of the next-in-line front-door μOP.

14. An article of manufacture comprising:
   a machine accessible medium providing content that, when accessed by a machine, causes the machine to determine a criticality of a next-in-line μOP of a front-door stream, the front-door stream including μOPs received from a scheduler and a replay loop;
   if the next-in-line μOP of the front-door stream is not critical, place the next-in-line μOP of the front-door stream into the replay loop and place a next-in-line μOP of a side-door stream into an execution stream; and
   if the next-in-line front-door μOP is critical, place the next-in-line front-door μOP into the execution stream and hold the next-in-line side-door μOP.

15. The article of manufacture of claim 14, wherein the determination of the criticality of the next-in-line front door μOP is based on one or more metrics selected from a group consisting of an age of the next-in-line front door μOP and a priority of a thread associated with the next-in-line front door μOP.

16. The article of manufacture of claim 15, wherein the content, when accessed, further causes the machine to hold the next-in-line μOP of the side-door stream until a next clock cycle.

17. An apparatus comprising:
  a scheduler to provide a front-door stream, the front-door stream including μOPs received from an instruction decoder and a replay loop; and
  a page miss handler to provide a side-door stream, the page miss handler to determine a criticality of a μOP in the front-door stream,
  if the front-door μOP is not critical, place the front-door μOP into the replay loop and place a μOP of the side-door stream into an execution stream, and
  if the front-door μOP is critical, placing the front-door μOP into the execution stream and holding the side-door μOP.

18. The apparatus of claim 17, wherein the determination of the criticality of the front-door μOP is based on one or more metrics selected from a group consisting of an age of the front-door μOP and a priority of a thread associated with the front-door μOP.

19. The apparatus of claim 17, the page miss handler to hold the side-door μOP until a next clock cycle.

* * * * *